United States Patent [19]
Burns, Jr.

[11] Patent Number: 5,924,163
[45] Date of Patent: Jul. 20, 1999

[54] DEMAND RESPONSIVE CENTRAL VACUUM SYSTEM

[75] Inventor: James E. Burns, Jr., Stafford Springs, Conn.

[73] Assignee: The Spencer Turbine Company, Windsor, Conn.

[21] Appl. No.: 08/876,146

[22] Filed: Jun. 13, 1997

[51] Int. Cl.⁶ .................................................. A47L 5/38
[52] U.S. Cl. ........................................... 15/314; 15/319
[58] Field of Search ...................................... 15/314, 319

[56] References Cited

U.S. PATENT DOCUMENTS

| | | | |
|---|---|---|---|
| 4,225,272 | 9/1980 | Palmovist | 15/314 X |
| 4,701,192 | 10/1987 | Burke | 15/319 X |
| 4,991,253 | 2/1991 | Rechsteiner | 15/319 X |
| 5,274,878 | 1/1994 | Radabaugh et al. | 15/314 |
| 5,566,421 | 10/1996 | Pittman | 15/314 |

*Primary Examiner*—Chris K. Moore
*Attorney, Agent, or Firm*—McCormick, Paulding & Huber

[57] ABSTRACT

A demand responsive central vacuum system having a vacuum producer driven by a variable speed motor and connected to a piping system having inlet ports located in areas to be cleaned. Wet and dry separators are connected in tandem in the piping system between the inlet ports and the vacuum producer. A flow switch detects when a flow condition is present in the piping system indicating that the vacuum system is in use and provides a signal to a controller which increases the operational speed of the drive motor and opens a bleed valve connected to the piping system to bleed air into the piping system.

12 Claims, 2 Drawing Sheets

5,924,163

DEMAND RESPONSIVE CENTRAL VACUUM SYSTEM

BACKGROUND OF THE INVENTION

This invention relates in general to vacuum producing apparatus and deals more particularly with improvements in central vacuum cleaning system.

Central vacuum systems of the type with which the present invention is concerned are typically found in office buildings, hospitals, hotels, schools and industrial plants, for example. The basic components of such central vacuum system installations essentially comprise a vacuum producer and a separator or separators for collecting dust, dirt and liquid and solid waste materials and for reclaiming valuable scrap materials produced in an industrial process, if desired. The components further include a piping system which has inlet valves or ports in areas of a building to be cleaned and a network of tubular conduit for conveying vacuumed material to a central collection point for removal or disposal.

In a commercial or industrial installation, the vacuum producer and separator or separators may be installed at a remote location in a building, such as a basement or equipment room. This arrangement isolates the collected materials, including contaminants, from areas of the building that have been cleaned, thereby helping to maintain healthful environmental conditions in the building.

Inlet valves positioned at desired locations throughout a building are connected to the tubular conduit network which carries the vacuumed material to the central collection point. Portable hoses with attachments for vacuum pick-up and which can be inserted into and coupled to the inlet valves are employed for local area vacuum cleaning. A wide variety of vacuum pick-up tools are presently available to satisfy the diverse cleaning and material pick-up jobs encountered in normal maintenance of a commercial building or industrial plant, for example.

In a system of the aforedescribed general type, in order to supply vacuum at peak demand, it may be necessary to operate the vacuum producer at about 60% of load capacity all times, so that required vacuum will always be substantially immediately available at every inlet valve or valve port throughout a building, even though most of the valve ports are not in use much of the time. Such systems are often provided with a simple on/off switching device and maintained in operation at all times during hours of normal usage. Other systems, subject to less frequent usage, may include remote starting and stopping devices positioned at numerous locations throughout a building in which the system is installed. However, the provision of such multiple control devices requires a substantial amount of additional wiring throughout the building and adds substantially to system installation cost.

Accordingly, it is the general aim of the present invention to provide an improved demand responsive central vacuum system which conserves power during normal use and which affords opportunity for reduced installation cost.

SUMMARY OF THE INVENTION

In accordance with the present invention an improved demand responsive central vacuum system is provided which includes a vacuum producer, a piping system having at least one inlet valve, at least one separator connected to the piping system between the one inlet valve and the vacuum producer and a central controller for operating the system. In accordance with the present invention a variable speed drive unit is provided for operating the vacuum producer. The control system for operating the vacuum producer includes a sensing means for detecting changes in demand for vacuum produced by the system to alter the operational speed of the vacuum producer drive unit to satisfy demand, whereby during periods of low demand the system may operate at a low load condition to minimize power consumption.

BRIEF DESCRIPTION THE DRAWINGS

DETAILED DESCRIPTION OF PREFERRED EMBODIMENT

Figure 1:
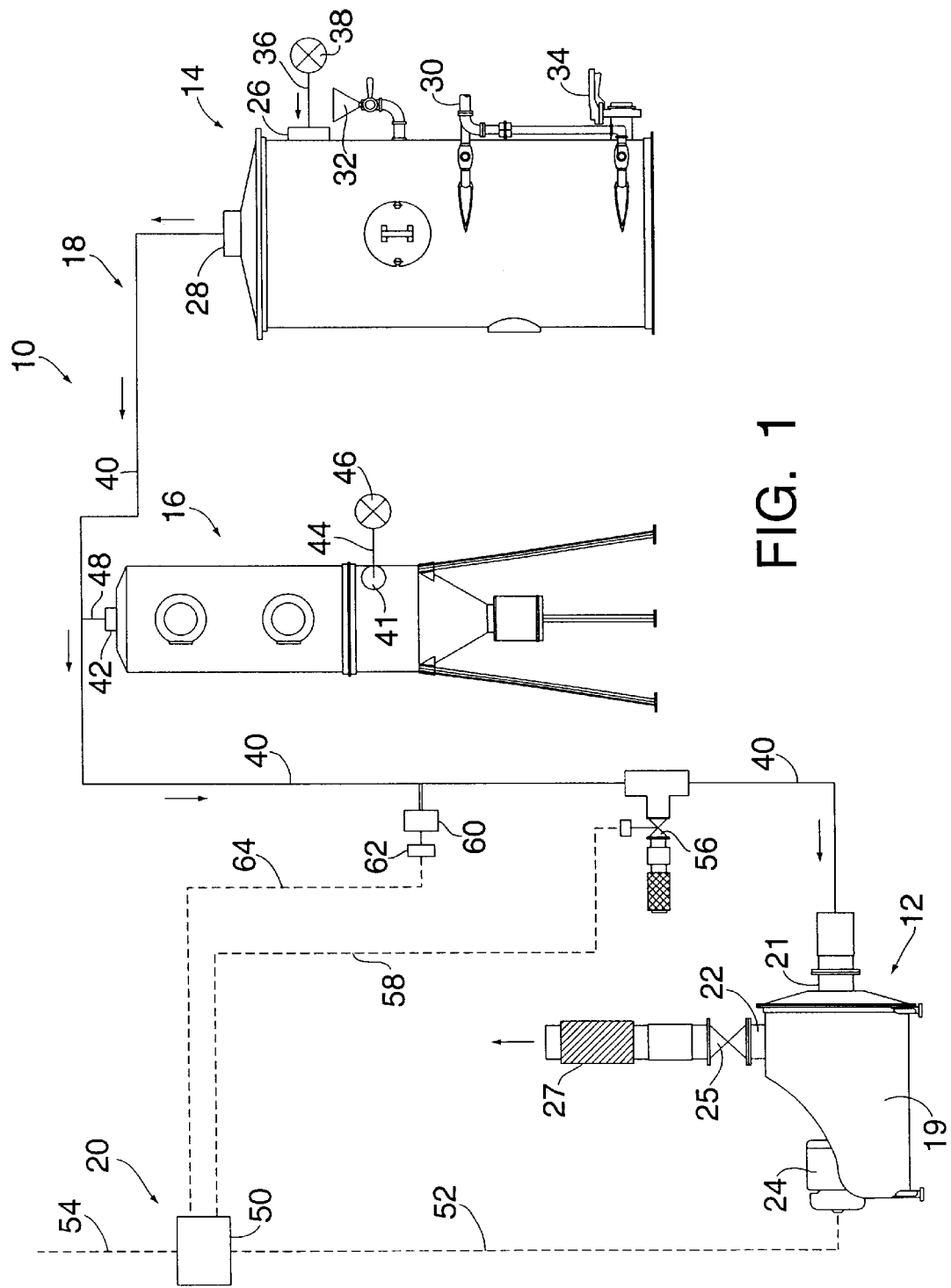
FIG. 1 is a somewhat schematic view of a typical central vacuum cleaning system embodying the present invention.

In the drawings, and in the description which follows, the present invention is illustrated and described with reference to a typical central vacuum cleaning system shown somewhat schematically in FIG. 1 and indicated generally by the reference numeral 10. The illustrated central vacuum system 10 is a closed system and essentially comprises a vacuum producer, indicated generally at 12, and one or more separators for collecting dust, dirt, liquids and waste material or for reclaiming valuable scrap material resulting from the production of an industrial product, if desired. Two separators are employed in the illustrated system 10 and include a wet separator and a dry separator, respectively generally designated by the numerals 14 and 16. The two separators 14 and 16 are connected in tandem to the vacuum producer 12 by a piping system, indicated generally by the numeral 18, in a manner well known in the vacuum cleaning art, as will be hereinafter more fully discussed. The vacuum producer 12 and the separators 14 and 16 are preferably installed at a location remote from areas to be cleaned, as for example, in a basement or equipment room of a industrial plant or commercial building in which the system is installed. This arrangement effectively isolates collected material, including contaminants, from areas of the building that have been cleaned. Since the illustrated vacuum system is a closed one, contaminated air is not reintroduced into areas that have just been cleaned by the system, thereby helping to assure maintenance of a healthful building environment. Further, and in accordance with the invention, the central vacuum cleaning system 10 includes a control system indicated generally at 20 and responsive to the demands placed upon the system, all of which is hereinafter further described.

Considering now the system 10 in further detail, the illustrated vacuum producer 12 comprises a multi-stage turbo compressor or centrifugal blower manufactured and marketed by The Spencer Turbine Company, Windsor, Conn., assignee of the present invention, and has a casing 10 including an inlet 21 and an outlet 22 and containing a plurality of rotary impellers (not shown) mounted on the drive shaft of an associated drive motor 24. The illustrated drive motor 24 is a variable speed electric motor which may be operated at either 1750 RPM or 3500 RPM. A blast gate 25 and a silencer 27 are connected to the outlet 22 on the vacuum producer 12 in a conventional manner well known in the vacuum producing art.

The wet separator 14 is a conventional hospital separator of a type manufactured and marketed by The Spencer Turbine company, assignee of the present invention, and has an intake fitting 26 and an outlet fitting 28. The separator 14 is connected in a conventional manner to a water supply line 30 and further includes a funnel cock indicated at 32 to facilitate pouring of disinfectants into the separator. A quick opening valve 34 is also provided for discharging liquid from the separator 14 as is conventional on such separators.

The inlet fitting 26 on the wet separator is connected to a tubular conduit 36 which comprises a part of the piping system 18 and has at least one inlet valve 38 preferably positioned at a building location remote from the separator and in an area to be cleaned. The inlet valve 38 is of a well known type commonly used in central vacuum systems and may, for example, comprise either a wall or flush-mounted floor valve. The valve 38 has a closure moveable between open and closed positions. When the closure associated with the valve 38 is in its open position air is free to pass through the valve 38 and into the conduit 36. When the closure is in its closed position the flow of air through the valve 38 and into the tubular conduit 36 is substantially blocked. In its open position, the valve 38 is adapted to receive and mate with a coupling on a lightweight flexible vacuum cleaning hose (not shown). A suitable liquid-pick-up attachment connected to the vacuum cleaner hose enables pick-up of liquid waste in a manner well known in the vacuum cleaning art. Connection between the separator 14 and the vacuum producer 12 is provided by another tubular conduit 40 which comprises a part of the piping system 18 and which is attached by suitable couplings to the outlet fitting 26 on the separator 14 and to the inlet 21 on the housing of the vacuum producer 12.

The dry separator 16 comprises a tubular bag separator of a type also manufactured an marketed by the assignee of the present invention. The illustrated dry separator is particularly adapted for separating particulate material from an air stream and includes an inlet fitting 41 and an outlet fitting 42. The inlet fitting 41 is connected by a tubular conduit 44 to at least one inlet valve 46 also preferably disposed at a location remote from the separator and in an area to be cleaned. Like the previously described inlet valve 38, the inlet valve 46 may be either a wall or floor mounted type, for example, and has a closure moveable between open and closed positions. In its open position, the closure associated with the valve 46 permits air to flow through the valve and into the conduit 41. In its closed position the valve closure substantially prevents flow of air through the valve 46 and into the conduit 42. In its open position, the valve 46 is adapted to receive and mate with a coupling member on a lightweight vacuum hose of a well known type (not shown) fitted with a suitable attachment for picking up dust, dirt and like solid materials. The outlet fitting 41 on the dry separator 16 is connected in communication with the vacuum producer 12 by a tubular conduit 48 connected to the conduit 40, substantially as shown in the FIG. 1. The path of air flow through the system is indicated by directional arrows in FIG. 1.

The control system 20 for operating the vacuum producer 12 includes an electrical controller 50 electrically connected to the variable speed drive motor 26 by an electrical supply line 52. The controller 50 includes a variable frequency drive unit (VFD) and receives power from a supply source through a supply line 54. The control system 20 further includes an electrically controlled bleed valve 56 connected to the tubular conduit 36 between the dry separator 16 and the vacuum producer 12. The bleed valve 56 is movable between open and closed positions and moves to and operates in its open position to supply make-up air to the vacuum producer 12 in response to an electrical signal received from the controller 50 through a signal line 58.

A sensing device or flow sensing switch 60, which also comprises a part of the control system 20, is connected to the tubular conduit 40 between the dry separator 16 and the vacuum producer 12. The flow switch 60 is responsive to a predetermined air flow condition within the tubular conduit 40 and operates in conjunction with a timing device 62 to provide an operating signal to the controller 50 through a signal line 64. The flow switch 60 is preferably positioned in the conduit 40 a substantial distance from the bleed valve 56 to be free from the operational influence of the bleed valve.

Figure 2:
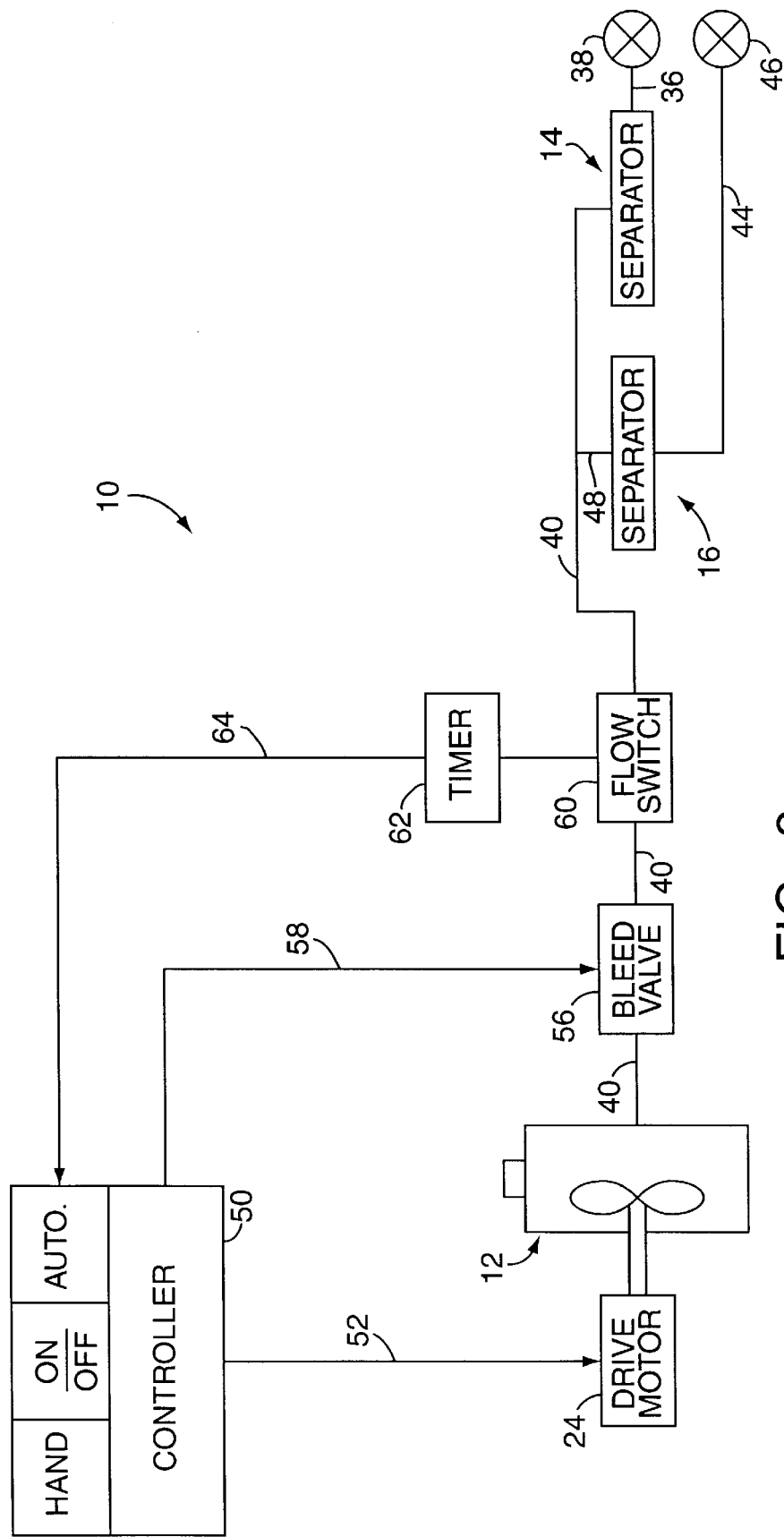
FIG. 2 is a diagrammatic illustration of the control system for the central vacuum system shown in FIG. 1.

The control system 20 further includes a selector switch 66 (FIG. 2) positioned on the controller 50 and having automatic and manual or "hand" positions. A manually operated disconnect switch 68 on the controller 50 is operative to energize or start and to shut down the system 10.

When the selector switch 66 is in manual or "Hand" position the vacuum producer motor 24 will operate at high speed (3500 RPM) at all times. When the selector switch 66 is placed in its automatic position the system 10 will operate as a demand responsive system. If the vacuum system is not being used all of the inlet valves 38 and 46 will be in closed condition, thereby preventing entry of air into the system through any of these inlet valves. When the latter condition exists the control system 20 is set to operate the motor 26 at its low operating speed (1750 RPM), since there are no demands being placed upon the system.

When the system 10 is placed in service by opening the closure on one or more of the inlet valves 38, 46, air is drawn into the system through the open inlet valve or valves thereby causing a flow condition within the piping system 18. When the flow sensing switch 60 detects such a flow condition within the system a flow condition signal is transmitted to the controller 50 through the signal line 64. The controller 50 responds to reception of the flow condition signal by altering the operating speed of the drive motor 26 or more specifically increasing the operating speed of the drive motor from 1750 RPM to 3500 RPM. The controller 50 also sends a substantially simultaneous signal to the bleed valve 56 through the signal line 58 causing the bleed valve to open thereby bleeding air into the vacuum producer 12. The vacuum producer will continue to operate at its higher operating speed (3500 RPM) for as long as one or more of the valves 38, 46 remain in open position.

The timing device 62 is provided to compensate for any minor momentary interruptions in flow which may occur within the piping system while the system is in use. Such an interruption in the flow condition within the piping system may, for example, occur when a piece of waste material is drawn into the system causing a momentary constriction or when a vacuum hose is removed from one of the inlet valves momentarily. In the absence of the timing device such a minor interruption in flow detected by the flow switch 60 could cause the motor 24 to switch to low speed operation. To overcome this problem the timing device 62 is provided which maintains the flow condition signal for a predetermined period of time after the flow switch 60 detects a no flow condition. The timing device may be adjusted, however, a 10 second time delay is usually sufficient to overcome the aforesaid minor problems and avoid annoying interruptions resulting in reductions in vacuum at open inlet valves while the system is in normal operation.

When the system is no longer in use and the various vacuum hoses have been uncoupled from associated inlet valves 38 and 46, the latter valves will return to closed position, thereby interrupting the flow of air from the separator or separators and toward the vacuum producer 12. The change in the condition of air flow through the portion of the conduit 40 which contains the flow switch 60 will be detected by the flow switch. This change in flow condition causes the controller 50 to operate shifting the motor 26 to its lower operational speed (1750 RPM) and substantially simultaneously closes the bleed valve 56, thereby returning the system 10 to its standby or low speed operating condition.

The power consumption of the vacuum producer 12 is generally proportional to its output throughout its operating range. The actual air volume delivered by the vacuum producer 12 determines the amount of power consumed by operating the drive motor 26. Thus, by operating the drive motor 26 at low speed to maintain the system in a standby condition when the system it is not being used to perform a cleaning function will result in a substantial saving in power. More specifically, by operating the system at low speed and closing the bleed valve 56 when the system is not being used, the horsepower requirements of the system will drop. It has been found, for example, that a decrease from 16 BHP at minimum flow (3500 RPM & 8.2" hg) to approximately 1.8 BHP (1750 RPM & 2.5" hg) may be realized which may result in the realization of a considerable saving, depending on system usage. Thus, the system herein before described not only saves energy but can eliminate the need to install remote stop and start devices throughout a building in which the system is installed which will result in a substantial saving in system installation costs.

Further, when the system is used to serve a "clean room" the system, in its stand-by operating condition, will maintain the piping system under slight negative pressure, which is desirable, to prevent the possible escape of dust or dirt from the system into the clean room atmosphere.

Although the present invention has been illustrated and described with reference to a central vacuum cleaning system wherein the vacuum producer has only high and low speed settings it should be understood that motor speed requirements, flow switch and timer settings may vary over wide ranges depending on system requirements and that such variations in the operational parameters of the system are contemplated within the scope of the invention.

I claim:

1. In a central vacuum cleaning system having a vacuum producer, a piping system connected to said vacuum producer and including at least one inlet valve having an open position and a closed position, the inlet valve in its open position allowing air to flow into said piping system, the inlet valve in its closed position substantially blocking flow of air into said piping system, at least one separator connected to said piping system between said one inlet valve and said vacuum producer and through which air is constrained to pass in flowing from said inlet valve to said vacuum producer, and a control system for operating said vacuum producer, the improvement wherein said vacuum producer has a drive motor having a plurality of operational speeds and said control system includes flow sensing means for detecting a predetermined flow condition within said piping system and including a flow switch, and motor control means for altering the operational speed of said motor in response to the detection of said predetermined flow condition by said flow sensing means and including timing means for maintaining the operational speed of said motor for a predetermined period of time after an interruption in said predetermined flow condition and including a timing device operating in conjunction with said flow switch to delay the signal output from said flow switch.

2. In a central vacuum cleaning system as set forth in claim 1 the further improvement wherein said sensing means is disposed within said piping system between said one separator and said vacuum producer.

3. In a central vacuum cleaning system as set forth in claim 1 the further improvement wherein said central vacuum cleaning system includes a bleed valve connected to said piping system having an open condition wherein air may enter the piping system through said bleed valve and a closed position wherein entry of air into said piping system through said bleed valve is blocked and wherein said control system includes means for placing said bleed valve in its open position in response to the detection of said predetermined flow condition by said flow sensing means.

4. In a central vacuum cleaning system having a piping system including at least one inlet valve having an open condition wherein air is free to flow through the one inlet valve into the piping system and a closed condition wherein the flow of air through the one inlet valve and into the piping system is substantially blocked, vacuum producing means operative to induce the flow of air through said one inlet valve into the piping system and to the vacuum producing means when the one inlet valve is in its open condition, drive means for operating said vacuum producing means at a plurality of differing operational speeds, separating means connected to said piping system between the one inlet valve and the vacuum producing means and through which air is constrained to pass in flowing in the piping system from the one valve port to the vacuum producing means, and control means for operating the vacuum cleaning system, the improvement wherein said control means includes sensing means for detecting an air flow condition in said piping system which indicates that the system is in use, and control mean for increasing the operational speed of said drive means in response to the detection of said air flow condition within said piping system by said sensing means.

5. In a central vacuum cleaning system as set forth in claim 4 the further improvement wherein said control means includes timing means for maintaining the operational speed of said motor for a predetermined period of time after and interruption in said air flow condition.

6. In a central vacuum cleaning system as set forth in claim 4 the further improvement wherein said flow sensing means comprises a flow switch and a timing device operating in conjunction with said flow switch for delaying the signal output from said flow switch.

7. In a central vacuum cleaning system as set forth in claim 6 the further improvement wherein said system includes a bleed valve connected to said piping system having an open condition wherein air may enter the piping system through said bleed valve is blocked and wherein said control system includes means; for placing said bleed valve in its open position in response to the detection of said air flow condition by said air flow sensing means.

8. In a central vacuum cleaning system as set forth in claim 7 the further improvement wherein said bleed valve is connected to said piping system between said separating means and said vacuum producing means.

9. In a central vacuum cleaning system as set forth in claim 8 the further improvement wherein said flow switch is positioned within said piping system a sufficient distance from said bleed valve to be free of the operational influence of said bleed valve.

10. In a central vacuum cleaning system as set forth in claim 1 the further improvement wherein said vacuum producer comprises a multi-stage centrifugal blower.

11. In a central vacuum cleaning system as set forth in claim 1 the further improvement wherein said central vacuum cleaning system includes a wet separator and a dry separator connected in tandem by said piping system and to said vacuum producer.

12. A central vacuum cleaning system as set forth in claim 1 wherein said dry separator is connected in said piping system between said wet separator and said vacuum producer.

* * * * *